J. T. GOODRUM, Jr.
INSECT TRAP.
APPLICATION FILED FEB. 14, 1917.
1,231,877.
Patented July 3, 1917.
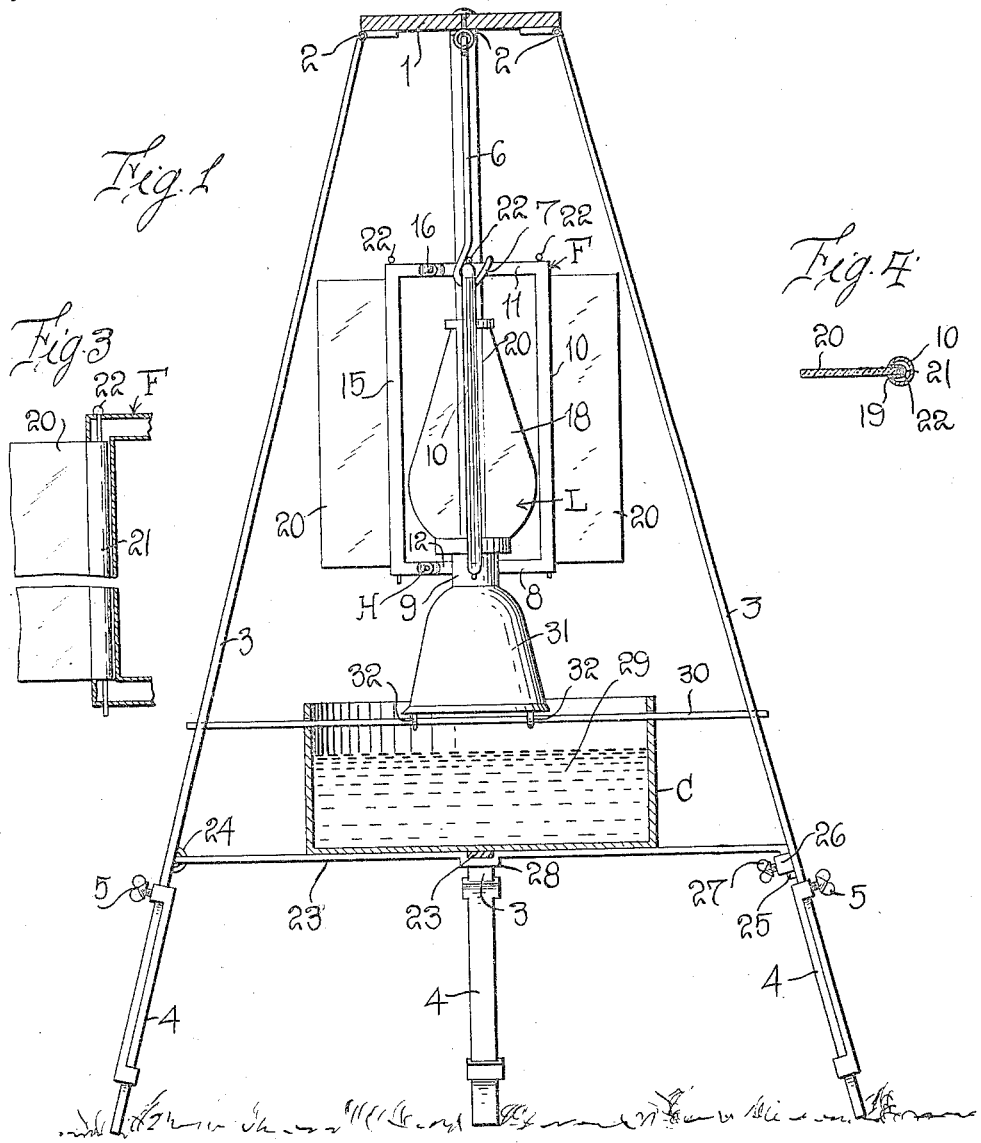
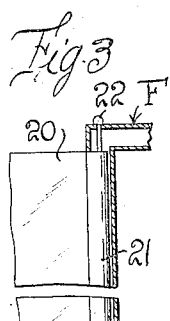
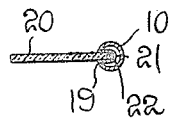
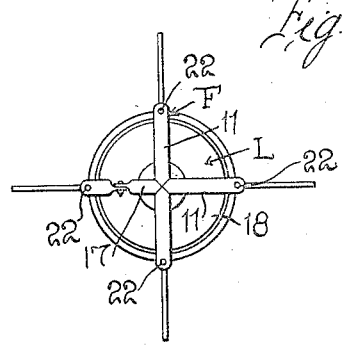
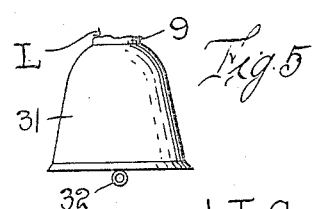
Inventor
J. T. GOODRUM JR.
By Watson E. Coleman
Attorney

UNITED STATES PATENT OFFICE.

JOHN T. GOODRUM, JR., OF VIENNA, GEORGIA.

INSECT-TRAP.

1,231,877.  Specification of Letters Patent.  Patented July 3, 1917.

Application filed February 14, 1917. Serial No. 148,561.

*To all whom it may concern:*

Be it known that I, JOHN T. GOODRUM, Jr., a citizen of the United States, residing at Vienna, in the county of Dooly and State of Georgia, have invented certain new and useful Improvements in Insect-Traps, of which the following is a specification, reference being had to the accompanying drawings.

This invention relates to insect traps and has relation more particularly to a device of this general character especially designed and adapted for use in the trapping of boll weevils; and it is an object of the invention to provide a novel and improved device of this general character including an illuminating member beneath which is positioned an exterminating element preferably in the form of a liquid.

It is also an object of the invention to provide a device of this general character having novel and improved means whereby the same may be readily and conveniently arranged in applied position, and wherein the illuminating member and a container for the exterminating medium are effectively held against accidental displacement.

The invention consists in the details of construction and in the combination and arrangement of the several parts of my improved insect trap whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawings, wherein—

Figure 1 is a vertical sectional view taken through a trap constructed in accordance with an embodiment of my invention with the illuminating member in elevation;

Fig. 2 is a view in top plan of the illuminating member as herein embodied;

Fig. 3 is an enlarged fragmentary view partly in elevation and partly in section illustrating in detail the mounting of a transparent member as herein disclosed;

Fig. 4 is a transverse sectional view taken through Fig. 2; and

Fig. 5 is a fragmentary view in elevation of the base or well portion of the illuminating member illustrating in detail certain features of the invention as herein included.

As disclosed in the accompanying drawings, 1 denotes a top piece or crown having hingedly engaged with the under surface thereof, as at 2, the supporting legs 4 preferably four in number, and coacting with the lower ends of the legs 3 are the feet 4 capable of adjustment longitudinally of the legs 3 and adapted to be maintained in their various adjustments through the medium of the binding screws 5.

6 denotes a hanger depending from the top piece or crown 1 and which is herein disclosed as a rod having its lower end provided with the hook 7 detachably engaged with the upper portion of a frame F of the illuminating member L.

As herein embodied, the frames F are four in number and are equidistantly spaced and three of said frames comprises base arms 8 radiating from the burner 9 of the illuminating member L and terminating in the upstanding extensions 10. The upper end portions of the extensions 10 are provided with the inwardly directed arms 11 suitably secured one to the other at their inner ends.

The remaining frame F includes an arm 12 radiating from the burner 9 and with which is pivotally engaged, as at 14, the upstanding member 15 which is adapted to be detachably engaged at its upper end portion, as indicated at 16, with the short arm 17 suitably engaged with the inwardly directed portions 11 hereinbefore referred to. It is thought to be self-evident that by swinging the member 15 downwardly the globe 18 of the illuminating member L may be readily applied to or removed from operative engagement with the burner 9.

The outer face of each of the extensions 14 and the member 15 is provided with a groove 19 in which is seated a vertical marginal portion of a glass plate 20 preferably rectangular in form and which serves as a reflecting medium for attracting insects, such as boll weevils.

The marginal portion of the plate 20 within the groove 19 is provided with a binding 21 which affords a barrel through which the removable pin 22 is adapted to be disposed, said pin being also directed through the closed ends of the groove 19 whereby it will be perceived that the plate 20 is effectively held when in applied position.

At a predetermined point below the member L the opposed legs 3 are connected by a brace member 23, one end of said member 23 being pivotally engaged, as at 24, with one of the legs while the opposite extremity of the brace member is provided with a downwardly disposed portion 25 adapted to be directed through a loop 26 carried by the opposed leg 3, and threaded through said loop 26 is a binding screw 27 adapted to coact with the angular portion 25 in order to effectively maintain the brace member 23 in assembled relation. It is also to be noted in Fig. 1 that one of the brace members 23 is provided with an offset or depressed portion 28 in which the second brace member 23 is seated so that the upper face of both of the members 23 are substantially flush.

Resting upon the brace members 23 is a container or tank C having its upper face open and which is adapted to contain a liquid solution 29 of such a character as to kill the insects which may fall therein. The container or tank C is held against accidental displacement through the medium of the rod 30 removably disposed through a pair of opposed legs 3 and through the upper portion of the side walls of the container, as is believed to be clearly disclosed in Fig. 1.

It has also been found of advantage to provide the well 31 of the illuminating member L with the depending eyes 32 arranged in diametrically opposed relation and through which the rod 30 is also loosely directed. By this arrangement it will be at once self-evident that the rod 30 serves to hold the member L substantially in a fixed position and which is especially desirable during a storm or high winds.

From the foregoing description, it is thought to be obvious that a trap constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice, except as hereinafter claimed.

I claim:

1. A device of the character described comprising an illuminating member provided with supporting means, vertically disposed members supported directly by the illuminating member, each of said vertically disposed members being provided with grooves, a reflecting plate coacting with each of the vertically disposed members and having a marginal portion seated within the groove thereof, and means coacting with said plate and vertically disposed member for holding the plate in applied position.

2. A device of the character described comprising an illuminating member provided with supporting means, vertically disposed members supported directly by the illuminating member, each of said vertically disposed members being provided with grooves, a reflecting plate coacting with each of the vertically disposed members and having a marginal portion seated within the groove thereof, means coacting with said plate and vertically disposed member for holding the plate in applied position, one of said vertically disposed members being mounted for swinging movement, and means for locking the same in operative position.

In testimony whereof I hereunto affix my signature in the presence of two witnesses.

JOHN T. GOODRUM, Jr.

Witnesses:
A. S. GOODRUM,
W. H. MALONE.

Copies of this patent may be obtained for five cents each, by addressing the "Commissioner of Patents, Washington, D. C."